(12) United States Patent
Wittebrood

(10) Patent No.: US 6,753,094 B1
(45) Date of Patent: Jun. 22, 2004

(54) COMPOSITE SHEET MATERIAL FOR BRAZING

(75) Inventor: Adrianus Jacobus Wittebrood, Velserbroek (NL)

(73) Assignee: Corus Aluminium Walzprodukte GmbH, Koblenz (DE)

(*) Notice: Subject to any disclaimer, the term of this patent is extended or adjusted under 35 U.S.C. 154(b) by 0 days.

(21) Appl. No.: 09/959,195

(22) PCT Filed: Apr. 21, 2000

(86) PCT No.: PCT/EP00/03753
§ 371 (c)(1),
(2), (4) Date: Jan. 24, 2002

(87) PCT Pub. No.: WO00/64626
PCT Pub. Date: Nov. 2, 2000

(30) Foreign Application Priority Data

Apr. 22, 1999 (NL) ............................................ 99201232

(51) Int. Cl.⁷ ......................... B32B 15/08; B32B 15/20; B23K 35/22; B23K 35/363; B05D 1/36
(52) U.S. Cl. ...................... 428/626; 428/457; 428/461; 428/696; 428/650; 428/332; 228/262.9; 228/262.5; 427/201; 427/180; 427/196
(58) Field of Search ................................ 428/626, 546, 428/651, 652, 653, 332, 334, 335, 339, 341, 457, 461, 462, 469, 472, 689, 696, 697, 650; 427/58, 126.1, 201, 180, 123, 196; 228/262.9, 262.5, 262.1, 254

(56) References Cited

U.S. PATENT DOCUMENTS

| | | | |
|---|---|---|---|
| 3,163,499 A | 12/1964 | Bray | 29/191.2 |
| 3,951,328 A | 4/1976 | Wallace et al. | 228/207 |
| 3,971,501 A | 7/1976 | Cooke | 228/248 |
| 4,981,526 A | 1/1991 | Kudo et al. | 148/25 |
| 5,232,788 A | 8/1993 | Timsit et al. | 428/560 |
| 5,251,374 A | 10/1993 | Halstead et al. | 29/890.047 |
| 5,360,158 A | 11/1994 | Conn et al. | 228/56.3 |
| 5,534,582 A * | 7/1996 | Krause et al. | 524/441 |
| 6,059,174 A | 5/2000 | Kojima et al. | 228/183 |

FOREIGN PATENT DOCUMENTS

| | | |
|---|---|---|
| EP | 0276381 | 8/1988 |
| EP | 0291927 | 11/1988 |
| EP | 0936024 | 8/1999 |
| WO | 8203221 | 9/1982 |
| WO | 9413472 | 6/1994 |
| WO | 9640458 | 7/1997 |
| WO | 9824571 | 6/1998 |

OTHER PUBLICATIONS

SAE Technical Paper Services, 980052, Meurer et al, Stability of R134a in the Presence of NOCOLOK® Flux Residues (Feb. 1998).

* cited by examiner

Primary Examiner—Michael LaVilla
(74) Attorney, Agent, or Firm—Stevens, Davis, Miller & Mosher, LLP

(57) ABSTRACT

The invention relates to a composite sheet material for brazing, the composite sheet material having a structure comprising an aluminium or aluminium alloy substrate on at least one side coupled to a layer comprising a polyolefin/acrylic acid copolymer as a carrier filled with brazing flux material, and optionally also with a metal powder, in an amount sufficient to achieve brazing. The invention further relates to a method of manufacturing composite sheet material for brazing, which method comprises the steps (a) mixing the polyolefin/acrylic acid copolymer with the brazing flux material and/or metal powder, and (b) applying to at least one surface of the metal substrate a mixture of said copolymer filled with the brazing flux material and/or metal powder, in an amount sufficient to achieve subsequent brazing.

21 Claims, No Drawings

COMPOSITE SHEET MATERIAL FOR BRAZING

FIELD OF THE INVENTION

The invention relates to a composite sheet material for brazing, to the use of several components in such a composite sheet material, and further to a brazed assembly manufactured from such a composite sheet material and to a method a manufacturing such brazed assemblies.

DESCRIPTION OF THE PRIOR ART

A brazing technique which has become widely accepted involves an inert/controlled atmosphere furnace operation (CAB). To destroy and remove the aluminium oxide layer on the aluminium alloy and to protect it during brazing, a flux mixture is often being used to enhance the brazeability of the brazing alloy prior to brazing. A well known brazing process is the NOCOLOC (trade name) brazing process, developed by Alcan International Ltd, and for example as disclosed in U.S. Pat. No. 3,971,501 and U.S. Pat. No. 3,951,328. This process includes the steps of forming an assembly, cleaning the surfaces to be brazed to remove oil and grease to eliminate stopoff effects, applying a brazing slurry to the assembly, blowing off the excess slurry, drying the slurry onto the assembly, and then passing the assembly through a brazing furnace. The flux does not need to be removed at the end of the brazing cycle. The brazing slurry generally includes a brazing alloy and a flux material, but may include additional materials.

A disadvantage of this process are the many processing steps involved with the manufacturer of the assembly due to the use of such a brazing slurry.

Another disadvantage encountered with the mentioned brazing process is that more flux material is often required at the junction between for example the tubes and headers of a heat exchanger assembly than between the tubes and fins. To overcome this disadvantage, many manufacturers currently manually apply a paste-like substance between the tubes and headers prior to brazing. The paste-like substances provides additional filler metal between the tubes and headers and may add additional mechanical strength to the filet. However, such materials are expensive and occasionally interfere with the brazing process through the action of silicon erosion of the underlying aluminium tubes and headers. Also other methods of dealing with this disadvantage are known in the art.

A further disadvantage of the mentioned CAB brazing process is that only aluminium alloys with a limited magnesium level may be used at standard levels of this brazing flux application, typically up to about 5 gram flux/m$^2$. If the magnesium level in the aluminium alloy is above 0.3 weight percent, the flux material gets poisoned due to the formation of MgO. This disadvantage can only be partly be overcome by applying higher loads of flux material.

A further disadvantage of the mentioned brazing process is that if the fluxing material also contains silicon or zinc an uneven distribution of the silicon and zinc after brazing causes preferential corrosion sites in the assembly.

Many heat exchangers have alternating rows of tubes or plates with convoluted fins made of aluminium or an aluminium alloy. Many of these heat exchangers have turbulators disposed within the tubes that require internal brazing. Also, CAB furnace brazing suffers from the disadvantages that the internal tube surfaces and the heat exchanger require individual fluxing before assembly and an overall fluxing of the completed assembly before brazing. Further, CAB furnace brazing suffers from the disadvantage that the individual fluxing of the components of the heat exchanger is costly and time consuming.

SUMMARY OF THE INVENTION

An object of this invention is to provide a composite sheet material for brazing in an inert atmosphere furnace (CAB) operation, as a result of said composite sheet material less processing steps at the side of the manufacturer of the brazed assembly are required.

A further object of this invention is to provide a composite sheet material for brazing in an inert atmosphere furnace (CAB) operation, which avoids the need for individual fluxing of internal and external surfaces of the assembly prior to brazing.

A further object of this invention is to provide a composite sheet material which requires less lubrication means, and preferably no lubrication, in a forming operation prior to assembly of the individual components of an assembly for brazing.

A further object of this invention is to provide a method of manufacturing composite brazing sheet material in accordance with the invention.

In accordance with the invention in one aspect there is provided a self-brazing composite sheet material, wherein the composite sheet material having a structure comprising aluminium or aluminium alloy substrate on at least one side coupled to a layer comprising an olefin-acrylic acid copolymer as a carrier filled with a brazing flux material in an amount sufficient to achieve brazing.

In an embodiment of the invention the composite sheet material having a structure comprising an aluminium or aluminium alloy substrate on at least one side coupled to a layer comprising an olefin-acrylic copolymer as a carrier filled with both a brazing flux material and a metal powder, in an amount sufficient to achieve brazing.

Films made out of this type of copolymer are extensively used for the production of packaging material for food. Applying this type of copolymer on a metal substrate and using it as a carrier by filling it with one or more selected from the group comprising brazing flux material and metal powder, in an amount to achieve brazing, achieves several unexpected advantages with respect to brazing technology.

By the invention we can provide a self-brazing composite sheet material suitable for use in brazing applications, which overcomes several processing steps at the side of the manufacturer of a brazed assembly, such as individual fluxing of surfaces by applying the brazing flux by means of dipping or spraying, drying the applied brazing flux, etc. and all further disadvantages related to these steps.

By the invention we can provide a self-brazing composite sheet material for utilisation in brazing operations which no longer requires the step of individual internal fluxing of surfaces of assemblies prior to brazing.

The copolymer used is inexpensive and is characterised by excellent adhesion characteristics on a metal substrate, such that the copolymer used as a carrier may be applied on the substrate in the form as coil. Coils of the composite sheet material as such may be supplied to the manufacturer of brazed assemblies, which overcomes all necessary processing steps related to applying and removing of the brazing flux at this side.

The brazing flux material and/or metal powder are arranged essentially homogeneously throughout the copolymer carrier, where the copolymer carrier has a thickness in the range of up to 150 μm, and preferably up to 50 μm, and more preferably up to 10 μm, and most preferably of not more than 5 μm, and covers essentially the whole surface area of at least one side of the metal substrate. The thickness of the filled copolymer carrier is essentially the same over the whole surface area covered.

The type of copolymer used as carrier will decompose during heating up for the brazing cycle and leaves only the brazing materials, namely the fillings of the carrier, on the articles for clean and efficient brazing. By using a copolymer carrier as indicated a very uniform distribution of the brazing flux material and/or metal powder is obtained, allowing for a very good brazing process. The amounts of carbon residue on the brazed assembly obtained are extremely low and do not affect the final corrosion behaviour of the brazed assembly.

A further advantage of the composite sheet material is that it may contain dedicated amounts of brazing flux material and/or metal powder. Depending on the circumstances of the case the copolymer as a carrier may be filled with less or even more than standard amount. For example in the case where the metal substrate is an aluminium alloy containing more than 0.3 wt. % of Mg more brazing flux material than standard amounts may be added to the carrier in order to overcome the disadvantage of a higher Mg content as set out above. And further because the composite sheet material may guarantee a minimum amount of brazing flux material and/or metal powder per unit area due to the very uniform distribution, less filler is required in many applications.

A further advantage of the present invention is that the composite sheet material may be formed in a forming operation prior to assembling without the requirement of a lubricant due to the very good self lubricating nature of the copolymer used. Due to the good adhesion of the copolymer to the metal sheet substrate there is no peeling of during forming operations, not even in extreme situations.

A further advantage of the present invention is that scrap material of the composite sheet material may be recycled in a very convenient manner by using known recycling techniques. Because the type of copolymer used is can be "burnt off" very easily, for example by using known techniques for lacquered UBC's, and leaving very clean metal substrate material which may be readily re-used.

As used herein, the term "olefin" refers to any polymerizable olefin, which may be linear, branched, cyclic, aliphatic, aromatic, substituted, or unsubstituted. More specifically, included in the term olefin-containing polymer are homopolymers of olefin, copolymers of olefin, copolymers of an olefin and a non-olefinic comonomer copolymerizable with the olefin, such as vinyl monomers, and the like. Specific examples include, ethylene ethyl acrylate copolymer, ethylene/butyl acrylate copolymer, methylene/methacrylic acid copolymer, or ionomer resin. Modified olefin-containing polymer resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

The metal substrate may be in the form of a sheet material, a plate material, or an extrusion. These aluminium alloys are then used as the structural member, for which both non-heat treatable as heat treatable aluminium alloys may be applied. Typically material selected from the Aluminium Association 3xxx, 5xxx and 6xxx series aluminium alloys are used.

In an embodiment of the composite sheet material in accordance with the invention the metal substrate is coupled to said filled copolymer carrier via a layer of filler metal. In this case the copolymer carrier is being filled with at least a brazing flux material, and if desired additionally with a metal powder to further facilitate brazing.

The filled polymer carrier may be applied very advantageously on various clad metallurgical products, for example clad products such as disclosed in WO-A-98/24571, WO-A-94/13472, WO-A-96/40458.

In an embodiment of the composite sheet material in accordance with the invention said copolymer carrier is filled with at least a metal powder selected from the group comprising: aluminium, silicon, aluminium-silicon alloy, zinc, zinc-aluminium alloy, magnesium, aluminium-magnesium alloy, magnesium-zinc alloy, aluminium-zinc alloy, copper, copper alloy, nickel, titanium, silver, indium, lead, germanium, bismuth, strontium, tin, metal powder having a corrosion potential different from that of the underlying metal substrate, metal powder having a corrosion potential lower than that of the underlying metal substrate.

A wide variety of metal powder may be added in said copolymer carrier in dependence of the metal sheet substrate used, and when used also from the type of brazing flux. Metal powder particles range in size from up to 200 μm, but the preferred range is up to 60 μm, and more preferably in a range of up to 10 μm, in dependence of the thickness of the copolymer layer applied and for reasons of ease of processing.

In case where the metal substrate is made of aluminium or an aluminium alloy, the carrier may advantageously be filled with at least various metal powders. For the purpose of this application both silicon and germanium are considered to be metals.

An Al—Si powder or a suitable mixture of Al powder and Si powder may generally be used. The former is more preferable in order to ensure a better flowability of the brazing agent when the aluminium articles or aluminium alloy articles are brazed. A preferable content by weight of Si in the Al—Si powder is 3 to 15%, or more preferably 6 to 12% so that an appropriate liquidus line temperature is ensured to afford an excellent brazing. Alternatively, they may be added in the form of a Mg—Zn alloy powder or the like, or an Al—Si series alloy such as Al—Si—Mg alloy and Al—Si—Zn alloy. The addition of Sn or Cu powder to the metal powder or metal powder/flux material mixture may enhance for example corrosion resistance.

Addition of magnesium (Mg) will improve the mechanical strength of the brazed joint. Addition of indium (In) and/or zinc (Zn) and/or zinc-aluminium alloy will increase corrosion resistance, and the addition of bismuth (Bi) and/or strontium (Sr) will improve the brazeability of the articles, and further the addition of berryllium (Be) will be effect to more perfectly braze Mg-containing aluminium alloy articles.

In an embodiment the carrier is filled at least with a suitable brazing alloy powder such that the composite material does not need the additional layer of filler metal or brazing metal on at least one side of the metal substrate, which are most frequently used when brazing aluminium or aluminium alloys.

In an embodiment of the composite sheet material in accordance with the invention the polyolefin comprises ethylene. These copolymers provide an excellent adhesion on metal substrates, are inexpensive and readily commercially available. These copolymers leave almost no carbon residue on the final brazed assembly. Due to the excellent adhesion of the copolymer to the metal substrate there is no peeling of during forming operations, not even in extreme situations.

Ethylene/methacrylic acid copolymer, ethylene/acrylic acid copolymer and their metal-salt neutralized counterparts (e.g. ionomer resins) have been well known for several years to be the best of the metal-adhering polyolefin materials. Typical heat sealing materials are branched low density polyethylene (LDPE), ionomers such as the Surlyn (trade name) brand sold by DuPont Company, ethylene/methacrylic acid copolymers such as Nucrel (trade name) sold by DuPont Company, ethylene/acrylic acid copolymers such as Primacor (trade name) sold by Dow Chemical Company and EVA copolymers.

Although the invention works for a wide variety of densities of the polyethylene, low density polyethylene (LDPE) is preferred, since these polymers decompose at relatively low temperature. In a more preferred embodiment the VLDPE or even ULDPE are used, since these are even easier to remove and decompose at lower temperatures. The lower the decomposition temperature of the applied copolymer, the lower the brazing temperature may be chosen in dependence of the brazing filler and/or brazing flux material used.

The copolymer carrier may be filled with various kind of brazing flux materials depending on the type of metal substrate. In the embodiment of an aluminium or aluminium alloy substrate suitable brazing flux materials may be a fluoride flux, a chloride flux or the like. The suitable fluoride fluxes may include the compounds having a molecular formula $K_aAlF_{a+3}$ ('a' being an integer equal to or greater than 1), such as $KAlF_4$, $K_2AlF_5$ and $K_3AlF_6$. The fluoride fluxes further include: a simple mixture of KF and $AlF_3$; an eutectic mixture thereof; and a certain complex such as potassium fluoroaluminate. Any one of these fluxes may be selected, though two or more of them may be added in combination. Other suitable fluxes may contain potassium fluoroaluminate mixed with one or more of cesium chloride, rubidium chloride, lithium fluoride, cesium fluoride and other halide salts to reduce the melting point of the flux. Some preferred examples of chloride fluxes are those which contain ammonium chloride, $BaCl_2$, NaCl, KCl and/or $ZnCl_2$ as their main components. Either any one of them or any mixture thereof may be added to the carrier to produce the brazing flux material. The brazing flux material is also preferably used in a powder consistency, and in the embodiment of the combination with metal powder the brazing flux material powder are usually present in a metal/flux weight ratio range of 1:10 to 10:1.

The brazing flux material has preferably an average size of less than 5 micron, and more preferably less than 2 micron. Utilising such relatively small brazing flux material results in a very efficient CAB brazing operation, whereas in the forming operation of the composite sheet material prior to assembly before brazing does not result in any noticeable wear in the tooling. Further by using such relatively small brazing flux material in the copolymer carrier, the self lubrication properties of the copolymer carrier in a forming operation can be used optimally. It will be understood by those skilled in the art that the size of the brazing flux particles should be smaller than the thickness of the copolymer layer.

In accordance with the invention it has been found that good brazing of the resultant assembly can be achieved utilising lower amounts of brazing flux material than standard per side of the composite sheet material. Brazing flux material applied per side of the composite sheet material preferably does not exceed 5 gram/$m^2$, and preferably is less than 3 gram/$m^2$ to achieve brazing.

At present the most widely used brazing flux material is the NOCOLOK (trade name) material. An advantage of this brazing flux is that it is stable at room temperature in a normal atmosphere, because it is essentially nonhygroscopic. This means that the composite material in accordance with the invention may be stored for a long period of time without any deterioration of the carrier and its fillings. However, in the case that the carrier is filled with a material which is susceptible for atmospheric influences, than on the filled copolymer a further (co)polymer layer may be adhered to seal off the carrier from the atmosphere. There is no need for a metallic covering layer for protecting subsequent processing tools from damage by the powder in the copolymer carrier.

The invention also consists in the use of an polyolefin/acrylic acid copolymer in a composite material as set out above.

In a further aspect the invention consists in the use of a polyolefin/acrylic acid copolymer filled with one or more selected from the group comprising brazing flux material and metal powder, in an amount to achieve brazing, for use in a composite sheet material as set out above. In a more preferred embodiment for the metal powder a metal is being selected from the group comprising: aluminium, silicon, aluminium-silicon alloy, zinc, zinc-aluminium alloy, magnesium, aluminium-magnesium alloy, magnesium-zinc alloy, aluminium-zinc alloy, copper, copper alloy, nickel, titanium, silver, indium, lead, germanium, bismuth, strontium, tin, metal powder having a corrosion potential different from that of the underlying metal substrate, metal powder having a corrosion potential lower than that of the underlying metal substrate.

In another aspect of the invention there is provided in a method of manufacturing a composite sheet material as set out above, wherein the copolymer is firstly mixed at a temperature in the range of up to the normal processing temperature, e.g. by means of extrusion, of the copolymer used with the brazing flux material and/or metal powder, and then applied onto the aluminium or aluminium alloy substrate, being in the form of a sheet material or an extrusion. Where the method is used on an industrial scale, the mixture may be applied onto the metal substrate by means of techniques such as co-extrusion, spraying, thermal spraying, lamination and calandering, and roll coating. In the resultant composite sheet material the brazing flux material and/or metal powder are arranged essentially homogeneously throughout the copolymer carrier, where the copolymer carrier has a suitable thickness in the range of up to 150 micron, and preferably up to 50 micron, and more preferably up to 10 micron, and most preferably of not more than 5 micron, and covers essentially the whole surface area of at least one side of the metal substrate. The thickness of the filled copolymer carrier is essentially the same over the whole surface area covered.

In accordance with the invention it has been found that the mixing of the copolymer with the brazing flux material is preferably carried out in the absence of water as a solvent of the copolymer, and more preferably in the absence of any solvent for the copolymer. This achieves the effect that less processing step are required for the method of manufacturing the composite sheet material of the invention, e.g. the step of drying the applied filled carrier has been overcome. Furthermore, it achieves the effect that the subsequent CAB brazing operation can be carried out with a much higher efficiency, in particular since it has been found from experimental work that copolymers of the type set out above using water as a solvent as very difficult to use of subsequent brazing operations. The reasons behind this is not yet fully understood.

Where the metal substrate is in the form of a sheet material, the composite sheet material may advantageously be coiled and subsequently transported to a manufacturer of brazed assemblies, which does no longer have to apply the brazing flux material himself. Here the composite sheet material may be uncoiled, sized and cut, formed where necessary, assembled and heated to remove the copolymer carrier and subsequently heated to a temperature above the brazing alloy melting point for joining the surfaces of the assembly by means of brazing, and then allowing the brazed assembly to cool.

Where possible the heating of the assembly to remove the copolymer carrier in order to expose its fillings to the metal substrate and the heating for the brazing cycle advantageously may be combined. The self-brazing composite sheet material in accordance with the invention may be formed without the requirement of a lubricant due to the self lubricating nature of the copolymer used. And further the need for applying the brazing flux by means of dipping or spraying, drying the applied brazing flux, etc. and all further disadvantages related to these steps are overcome.

In another aspect the invention relates to a brazed, assembly comprising at least one component made of the composite sheet material in accordance with this invention, and which brazed assembly has been brazed preferably in a CAB brazing operation.

In a further aspect the invention relates to a brazed assembly which has at least one internal brazed surface. In the way it is achieved that the assembly does not need to be fluxed separately on the internal surface after assembling of the assembly prior to CAB brazing.

In a further aspect of the invention it related to a method of manufacturing a brazed assembly using the composite sheet material as set out above, comprising the subsequent steps of:

(a) providing at least one substrate material of aluminium or an aluminium alloy;

(b) coupling on at least one side of the substrate a filled polyolefin/acrylic acid copolymer carrier comprising brazing flux material, optionally in combination with a metal powder, in an amount sufficient to achieve brazing, as set out above;

(c) forming parts of which at least one is made of a composite sheet for brazing having a structure comprising an aluminium or aluminium alloy substrate on at least one side coupled to a layer comprising said copolymer as a carrier filed with the brazing flux material, optionally in combination with a metal powder, in an amount sufficient to achieve brazing;

(d) assembling the parts into the assembly;

(e) brazing the assembly in an CAB brazing operation to achieve brazing;

(f) cooling the brazed assembly to below 100° C. with a cooling rate of at least 20° C./min.

This achieves the effect providing a method for manufacturing a brazed assembly, in which method overcomes several processing steps at the side of the manufacturer of a brazed assembly, such as individual fluxing of internal and external surfaces by applying the brazing flux by means of dipping or spraying, drying the applied brazing flux, etc. and all further disadvantages related to these steps. Further advantages of this method have been set out above.

It should be mentioned here that from U.S. Pat. No. 5,251,374 a method is known for assembling a brazed heat exchanger unit. In the known method during assembling of the various parts very locally and accurately on specific surfaces a flux-brazing composition may be employed, so as to facilitate the brazing of internal and external joints of the heat exchanger. The flux-brazing composition consists of a conventional flux, such as potassium tetrafluoroaluminate particles, an aluminium-silicon powder, a metal whose electrode potential is less than that of the aluminium alloy from which the tubes and headers are formed, and a binder. The suggested binder is made of a hydroxypropyl cellulose. In an alternative embodiment the flux-brazing composition is suspended in a liquid carrier, such as a glycerin-ethylene glycol carrier system, to permit the flux-brazing composition to be applied as a slurry.

It should be mentioned here than from U.S. Pat. No. 5,360,158 a flux-coated alloy member for selectively placing a flux compound between an aluminium containing alloy and a joint of an assembly which is to be joined is known. The flux-coated alloy member comprises a band member formed from the alloy and a flux coating adhered to substantially all external surfaces of the band member, the flux coating comprising the flux compound dispersed in an adhesive binder, the adhesive binder being selected from the group consisting of (a) natural resins selected from the group of water-white resin and shellac, and (b) water-soluble epoxy resins, and whereby the flux-coated alloy member enables the flux compound to be selectively placed at the joint of the assembly so as to substantially eliminate the presence of excess flux compound at the joint.

Further it should be mentioned here that from WO-A-98/50197 a method is known comprising coating an aluminium formed material to be jointed with a flux composition comprising 0.5 to 25 parts by weight of a polymeric compound having a number average molecular weight of 50,000 to 5,000,000 and comprising repeating alkylene oxide units, 5 to 30 parts by weight of a fluoride flux, and water added as a liquid carrier in such an amount as will provide a total amount of the composition of 100 parts by weight, and heating the coated area to remove water, heating the coated area to decompose and remove the polymeric compound, and then conducting heating for brazing.

EXAMPLES

The invention will now be explained by several non-limitative examples.

Example 1

On a laboratory scale of testing the burn out characteristics of several polymers have been measured using Thermal Gravimectric Analysis (TGA). This TGA technique measures weight decrease versus temperature. The following data have been determined: (a) the temperature where the weight decrease becomes zero, and (b) the residual weight at this temperature. The results for several polymer tested are listed in Table 1.

TABLE 1

| Polymer | Temperature [° C.] | Residual weight [%] |
|---|---|---|
| Polyethylene terephthalate (PET) | 534 | 8.6 |
| Polyvinylacetate (PVA) | 534 | 8.9 |
| Polyethylene acid copolymer (PEA) | 500 | 0.02 |
| Polyethylene maleic acid modified (PE) | 500 | 0.02 |
| Polyethylenevinylacetate copolymer (PEVA) | 507 | 0.2 |
| Polyvinylbutyrate (PVB) | 496 | 2.1 |

From the results of Table 1 it can be seen that the copolymers PEA, PEVA and PE tested have good burn out properties, and of which PEA and PE show excellent burn out properties. Further several grades of PEA have been tested and all showed excellent burn out properties.

Example 2

On a laboratory scale of testing 183 gram of commercial available Nucrel (trade name) 1214 with 165 gram of NOCOLOK brazing flux material (particle size between 0.5 and 20 μm, having d10=0.76 μm and d90=4.99 μm) have been mixed for 20 minutes at a temperature of 210° C. Brazing sheet material consisting of 0.4 mm thick core material of AA3003-series alloy with a cladding of 10% of the core thickness of AA4343-series material has been used. The sheets have been cleaned with ethanol. The mixed copolymer with the flux material has been applied between two sheets of brazing sheet material followed by pressing for 1 minute with a pressure of 100 bar at a temperature of 250° C. After pressing the two sheets are immediately separated and allowed to cool to room temperature, and leaving a filled copolymer with a thickness of 5 μm. By repeating this procedure by putting a clean brazing sheet material on the brazing sheet with the 5 μm thick carrier, the resultant carrier thickness is 2.5 μm. Subsequently the brazing sheet material with the filled copolymer carrier were again placed in the press with the temperatures of the plates set at 160° C. and a sheet of Teflon (trade name) on the carrier coated side. Pressing took place at 250 bar for 30 seconds, which operation was carrier out to smoothen the surface of the copolymer flux.

The brazing sheet material with the filled carrier of 5 and 2.5 μm thickness have been brazed for 1 min. at 585° C. under controlled CAB conditions using nitrogen flow. The brazed configurations consisted of a brazing sheet material with dimensions 25×25 mm on top on which a V-shaped bended AA1000-series aluminium strip with thickness 1 mm has been placed; the V-shaped angle is 45°. The configuration applied was identical as demonstrated in FIG. 3 in the SAE-980052 paper entitled "Stability of R124a in the presence of Nocolok flux residues" by C. Meurer et al. The resultant brazed joint was excellent, the fillet size was fine, and the fillet was smooth without stitches, and the wettability of the filler in the corner of the V-shaped bend showed good capillary raise.

Example 3

Analogue to Example 2 in this experiment 135 gram of Nucrel (trade name)-1214, 125 gram of NOCOLOC brazing flux material (the same as with Example 2), and 81 gram of silicon powder (purity grade larger than 99% and smaller than 325 mesh) have been mixed and applied on an AA3003-series core material without a cladding material. The thickness of the resultant filed carrier was 50 μm.

The brazing sheet material with the filled carrier of 50 μm thickness have been brazed for 1 min. at 590° C. under controlled CAB conditions using nitrogen flow. The brazed configurations consisted of a brazing sheet material with dimensions 25×25 mm on top on which a V-shaped bend AA1000-series aluminium strip with thickness 1 mm has been placed; the V-shaped angle is 45°. The configuration applied was identical as demonstrated in FIG. 3 in the SAE-980052 paper entitled "Stability of R124a in the presence of Nocolok flux residues" by C. Meurer et al. The resultant brazed joint was excellent, the fillet size was fine, and the fillet was smooth without stitches, and the wettability of the filler in the corner of the V-shaped bend showed good capillary raise.

Example 4

Composite brazing sheet material in accordance with the invention comprising a filed carrier of 20 μm thickness on both sides of the sheet material has been subjected to Erichsen tests. The parameter were: 138 mm blank diameter, 0.5 mm thickness of the blank, blankholder force 5–8 kN. This was found that a deep-drawing-ratio of 1.84 no delamination of the copolymer occurred, nor on the inside or the outside of the deep-drawn cups.

Having now fully described the invention, it will be apparent to one of ordinary skill in the art that many changes and modifications can be made without departing from the spirit or scope of the invention as set forth by the claims appended hereto.

What is claimed is:

1. A coiled composite sheet material for brazing, the composite sheet material having a structure comprising a metal substrate, selected from the group consisting of an aluminium substrate and an aluminium alloy substrate on at least one side coupled to a copolymer carrier layer having a thickness of at most 150 μm and comprising copolymer of ethylene and acrylic acid as a carrier filled with a brazing flux material, said brazing flux material comprising at least one member of the group consisting of a fluoride flux and a chloride flux in an amount sufficient to achieve brazing, and the brazing flux material has an average particle size dimension of less than 5 μm and the amount of brazing flux material per side of the composite sheet material is less than 5 gram/m$^2$ and is arranged substantially homogeneously throughout the copolymer carrier layer and the thickness of the filled copolymer carrier layer is substantially the same over the whole surface area covered.

2. A composite sheet material in accordance with claim 1, wherein the metal substrate is coupled to the filled copolymer carrier via a layer of filler metal.

3. A composite sheet material in accordance with claim 1, wherein the copolymer carrier layer has a thickness of at most 50 μm, and covers substantially the whole surface area of at least one side of the aluminium or aluminium alloy substrate.

4. A composite sheet material in accordance with claim 1, wherein the brazing flux material in combination with metal powder, are arranged substantially homogeneously throughout the copolymer carrier layer.

5. A composite sheet material in accordance with claim 1, wherein the brazing flux material has an average particle size dimension of less than 2 μm.

6. A composite sheet material in accordance with claim 1, wherein the amount of brazing flux material per side of the composite sheet material is less than 3 gram/m$^2$.

7. A composite sheet material in accordance with claim 1, wherein at least one said copolymer carrier layer is filled with both said brazing flux material and metal powder.

8. A composite sheet material in accordance with claim 1, wherein the copolymer carrier layer has a thickness of at most 10 μm, and covers substantially the whole surface area of at least one side of the aluminium or aluminium alloy substrate.

9. A composite sheet material in accordance with claim 1, wherein the metal substrate comprises a member of the group consisting of Aluminium Association 3xxx, 5xxx, and 6xxx series aluminium alloys.

10. A composite sheet material in accordance with claim 1, wherein the copolymer carrier layer comprises said brazing flux material and a metal powder having a corrosion potential lower than that of the underlying metal substrate.

11. A composite sheet material in accordance with claim 1, wherein the copolymer carrier layer has a thickness of at most 5 μm, and covers substantially the whole surface area of at least one side of the aluminium or aluminium alloy substrate.

12. A composite sheet material for brazing according to claim 1, wherein the copolymer carrier layer comprises the copolymer as the carrier filled with both the brazing flux material and a metal powder, in an amount sufficient to achieve brazing.

13. A composite sheet material in accordance with claim 12, wherein the metal powder particles range in size up to 60 μm.

14. A composite sheet material in accordance with claim 12, wherein the metal powder particles range in size up to 10 μm.

15. A composite sheet material in accordance with claim 1, wherein the copolymer carrier layer is at least filled with the brazing flux material and a metal powder selected from the group consisting of aluminium, silicon, aluminium-silicon alloy, zinc, zinc-aluminium alloy, magnesium, aluminium-magnesium alloy, magnesium-zinc alloy, aluminium-zinc alloy, copper, copper alloy, nickel, titanium, silver, indium, lead, germanium, bismuth, strontium, and tin.

16. A method, of manufacturing composite sheet material for brazing of claim 1, which comprises:

(a) mixing the copolymer of ethylene and acrylic acid with the brazing flux material in the absence of water as a solvent for the copolymer of ethylene and acrylic acid, and (b) applying to at least one side of the metal substrate a mixture of the copolymer filled with the brazing flux material, in an amount sufficient to achieve subsequent brazing.

17. A method of manufacturing a composite sheet material for brazing of claim 12, which comprises:

a. mixing the copolymer of ethylene and acrylic acid with the brazing flux material and metal powder in the absence of water as a solvent for the copolymer of ethylene and acrylic acid, and b. applying to at least one side of the metal substrate a mixture of the copolymer of ethylene and acrylic acid filled with the brazing flux material and metal powder, in an amount sufficient to achieve subsequent brazing.

18. A method of use of a sheet of a composite sheet material as defined in claim 1, comprising brazing the sheet to another component of an assembly.

19. A method of manufacturing a brazed assembly using the composite sheet material of claim 1, comprising the steps of:

forming parts of which at least one is made of the composite sheet material;

assembling the parts into the assembly;

brazing the assembly in an CAB brazing operation to achieve brazing; and cooling the brazed assembly to below 100° C. with a cooling rate of at least 20° C./min.

20. A method of use of a sheet of a composite sheet material as defined in claim 15, comprising brazing the sheet to another component of an assembly.

21. A method of use of a sheet of a composite sheet material as defined in claim 15, comprising brazing the sheet to another component of an assembly using a controlled atmosphere (CAB) process.

* * * * *